(12) United States Patent
Bunk

(10) Patent No.: US 9,944,259 B2
(45) Date of Patent: Apr. 17, 2018

(54) METHOD AND SYSTEM FOR AVOIDING A VEHICLE COLLISION

(71) Applicant: Robert Bosch GmbH, Stuttgart (DE)

(72) Inventor: Michael Bunk, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 63 days.

(21) Appl. No.: 14/778,374

(22) PCT Filed: Jan. 29, 2014

(86) PCT No.: PCT/EP2014/051674
§ 371 (c)(1),
(2) Date: Sep. 18, 2015

(87) PCT Pub. No.: WO2014/146814
PCT Pub. Date: Sep. 25, 2014

(65) Prior Publication Data
US 2016/0272171 A1    Sep. 22, 2016

(30) Foreign Application Priority Data
Mar. 20, 2013 (DE) .................. 10 2013 204 893

(51) Int. Cl.
*G06F 7/70* (2006.01)
*G06F 19/00* (2011.01)
(Continued)

(52) U.S. Cl.
CPC ............ *B60T 7/22* (2013.01); *B60G 17/0164* (2013.01); *B60G 17/0195* (2013.01);
(Continued)

(58) Field of Classification Search
CPC ...... B60T 8/17558; B60T 8/4845; B60T 7/22; B60T 13/146
(Continued)

(56) References Cited

U.S. PATENT DOCUMENTS 5,654,715 A * 8/1997 Hayashikura ......... G01S 13/931
342/70
7,260,464 B2 * 8/2007 Fujinami ................... B60T 7/22
701/70
(Continued)

FOREIGN PATENT DOCUMENTS

DE      3840004 A1    5/1990
DE      4302541 A1    8/1993
(Continued)

*Primary Examiner* — Isaac G Smith
(74) *Attorney, Agent, or Firm* — Norton Rose Fulbright US LLP; Gerard Messina

(57) ABSTRACT

A vehicle includes a sensor device monitoring at least one collision region that is located in the surroundings of the vehicle for sensing at least one object that enters and/or is present in a possible collision region during motion of the vehicle; an electromechanical brake booster and braking force-regulating components coupled thereto, which are operationally integrated into a vehicle braking system for decelerating the vehicle; and a control device that receives signals from the sensor device and, on the basis of those signals, controls the brake booster and the braking force-regulating components and/or further active chassis components. A method for avoiding a collision between the vehicle and the at least one object includes, upon sensing the at least one object, modifying a driving speed and/or driving direction of the vehicle, with the aid of the control device in combination with the braking system and the braking force-regulating components.

16 Claims, 6 Drawing Sheets

(51) Int. Cl.

| | |
|---|---|
| *G06G 7/00* | (2006.01) |
| *B60T 7/22* | (2006.01) |
| *B60T 7/04* | (2006.01) |
| *B60T 13/14* | (2006.01) |
| *B60T 13/66* | (2006.01) |
| *B60T 13/68* | (2006.01) |
| *B60T 8/1755* | (2006.01) |
| *B60G 17/016* | (2006.01) |
| *B60G 17/0195* | (2006.01) |
| *B62D 15/02* | (2006.01) |
| *B60W 10/12* | (2012.01) |
| *B60W 10/184* | (2012.01) |
| *B60W 10/20* | (2006.01) |
| *B60W 30/09* | (2012.01) |
| *B60T 8/17* | (2006.01) |
| *B60T 8/176* | (2006.01) |
| *G01S 13/93* | (2006.01) |
| *B60T 8/24* | (2006.01) |
| *B60T 8/48* | (2006.01) |

(52) U.S. Cl.
CPC ............... *B60T 7/042* (2013.01); *B60T 8/17* (2013.01); *B60T 8/176* (2013.01); *B60T 8/17558* (2013.01); *B60T 13/146* (2013.01); *B60T 13/662* (2013.01); *B60T 13/686* (2013.01); *B60W 10/12* (2013.01); *B60W 10/184* (2013.01); *B60W 10/20* (2013.01); *B60W 30/09* (2013.01); *B62D 15/0265* (2013.01); *G01S 13/931* (2013.01); *B60G 2800/222* (2013.01); *B60T 8/246* (2013.01); *B60T 8/4845* (2013.01); *B60T 8/4872* (2013.01); *B60T 2201/022* (2013.01); *B60T 2201/14* (2013.01); *B60T 2260/06* (2013.01)

(58) Field of Classification Search
USPC .................................................. 701/70, 130
See application file for complete search history.

(56) References Cited

U.S. PATENT DOCUMENTS

| | | | | |
|---|---|---|---|---|
| 2002/0158510 | A1* | 10/2002 | Kobayashi | B60T 8/3265 303/155 |
| 2008/0192984 | A1* | 8/2008 | Higuchi | G08G 1/16 382/104 |
| 2011/0015818 | A1* | 1/2011 | Breuer | B60T 8/17558 701/31.4 |
| 2014/0229086 | A1* | 8/2014 | Udaka | B60T 7/22 701/75 |

FOREIGN PATENT DOCUMENTS

| | | |
|---|---|---|
| DE | 10326358 A1 | 12/2004 |
| DE | 102004056120 A1 | 5/2006 |
| DE | 102004058814 A1 | 6/2006 |
| DE | 102005026693 A1 | 6/2006 |
| DE | 102005025510 A1 | 12/2006 |
| EP | 1418104 A2 | 5/2004 |
| JP | H05208663 A | 8/1993 |
| JP | 2006199233 A | 8/2006 |
| JP | 2009166578 A | 7/2009 |
| JP | 2009184467 A | 8/2009 |
| JP | 2010044443 A | 2/2010 |
| JP | 2010202147 A | 9/2010 |
| JP | 2011063225 A | 3/2011 |
| JP | 2011136627 A | 7/2011 |
| JP | 2012131293 A | 7/2012 |

* cited by examiner

METHOD AND SYSTEM FOR AVOIDING A VEHICLE COLLISION

FIELD OF THE INVENTION

The present invention relates to a method and system for automatically avoiding a vehicle collision, in particular between vehicles and persons and/or objects located outside the vehicle, but also between two or more vehicles.

BACKGROUND

Future driver assistance systems utilize increasing amounts of surroundings information via radar, ultrasound, cameras, etc., thus enabling a plurality of possible driver assistance functions that assist the driver in critical driving situations, either to protect the driver and/or vehicle occupants or to prevent other traffic participants from being harmed.

Customer acceptance of such driver assistance system stands or falls by the actuators available in the vehicle, which initiate various vehicle reactions in accordance with the current vehicle state or driving situation, for example automatic emergency braking to avoid a rear-end accident or to avoid a collision with a pedestrian.

Interventions in the current operating state of a vehicle can occur in many ways. The possibility exists, for example, of applying control to various elements of the chassis, the drive train, the steering system, or the brakes by way of a control unit. For collision avoidance, a further distinction can be made between interventions that reduce the speed of the vehicle and interventions that also additionally modify the direction of travel.

Especially with braking interventions, the potential of an intervention depends critically on the available pressure buildup dynamics, and, for convenience-oriented functions, additionally on the resulting noise of the actuators used (as should be known, for example, from a conventional ESP/ABS system).

In particular, pressure buildups by way of the piston pump of an ESP hydraulic system offer insufficient pressure buildup gradients, and moreover generate considerable noise as a result of hydraulic and mechanical coupling to the vehicle.

The document DE 2012 104 793 A1 discloses a collision avoidance system that furnishes automatic steering control using differential braking in the event that standard steering control of a so-called "main vehicle" fails. The system ascertains whether a collision with an object, for example another vehicle or even a person, is imminent; and if so, ascertains an optimum path for the main vehicle to travel along in order to avoid the object in the case of an otherwise possible collision. The collision avoidance system can ascertain that automatic steering is necessary in order to cause the vehicle to follow the optimum path for avoiding the (collision) target. If the collision avoidance system ascertains that automatic steering is necessary, and ascertains that normal vehicle steering has failed, the system uses differential braking to steer the vehicle along the path.

SUMMARY

According to an example embodiment of the present invention, a method is provided for avoiding a collision between a moving vehicle and at least one object that enters and/or is present in a possible collision region during vehicle motion, where the vehicle includes (a) a sensor device for sensing the at least one object, the sensor device monitoring at least one collision region that is located in the surroundings of the vehicle, (b) an electromechanical brake booster and braking force-regulating components coupled thereto, which are operationally integrated into a vehicle braking system for decelerating the vehicle, and (c) a control device that receives signals from the sensor device and, on the basis of those signals, controls the brake booster and the braking force-regulating components and/or further active chassis components. The method includes, upon sensing at least one object, modifying a driving speed and/or driving direction of the vehicle, with the aid of the control device in combination with the braking system and the braking force-regulating components, in such a way that a collision with the at least one object is automatically avoided.

According to an example embodiment of the present invention, a collision avoidance system for a vehicle includes a sensor device for sensing at least one object that enters and/or is located in a possible collision region during a vehicle motion, the at least one collision region monitored by the sensor device being located in the surroundings of the vehicle; an electromechanical brake booster and braking force-regulating components coupled thereto via a hydraulic fluid, which are operationally integrated into a vehicle braking system for decelerating the vehicle; and a control device that receives signals from the sensor device and, on the basis of those signals, controls the brake booster and the braking force-regulating components and/or further active chassis components. The collision avoidance system, upon sensing of the at least one object, modifies a driving speed and/or driving direction of the vehicle, with the aid of the control device in combination with the braking system and the braking force-regulating components, in such a way that a collision with the at least one object is automatically avoidable.

An advantage of the example embodiments of the present invention results from the fact that, provided that the traffic situation allows it, a conventional electromechanical brake booster (a so-called "iBooster") in conjunction with a subordinate ESP unit can be used to impart to the vehicle an asymmetrical braking torque that on the one hand decelerates the vehicle in order to avoid a collision with, for example, a pedestrian, and furthermore influences the direction of the vehicle in such a way that the vehicle is guided around the pedestrian who is in the way The necessary pressure buildup dynamics are ensured here by the use of the iBooster (electromechanical brake booster), which can build up brake pressure not only very quickly but also very comfortably, i.e., with minimal noise emission. The subordinate ESP system (an ABS system would also be possible) allows an asymmetrical braking torque to be imparted by wheel-specific interventions, i.e., closing the inlet valves and optionally opening the outlet valves.

When it is recognized, from the available sensor suite, that a collision with a pedestrian is immediately impending, pressure is actively built up by the iBooster in order to decelerate the vehicle and, if possible, to bring it to a stop short of the pedestrian.

If this is no longer possible, a so-called "escape corridor" can be ascertained on the basis of the surroundings sensor suite in order to steer the vehicle around the pedestrian. This calculated trajectory of the vehicle can then be implemented by establishing a right/left asymmetrical braking torque, specifically in such a way that the pressure buildup is generated by the iBooster and the asymmetry by the components of the ESP/ABS. There is no need to apply control to the return delivery pump.

Alternatively, other active elements of the vehicle, such as the steering, differentials, active chassis components, can also be used to change the direction of the vehicle.

Preferably the sensor device generates signals on the basis of a sensing of an object using a radar device and/or an ultrasonic device and/or an image acquisition device, and conveys the signals, the sensor device monitoring one or more three-dimensional collision regions that, individually or together, cover the entire surroundings of the vehicle. Sensing of potential collision objects by the sensor device is thereby guaranteed.

Advantageously, a hydraulic fluid pressure buildup in the braking system is generated substantially with the aid of the brake booster, specifically in response to signals from the sensor device upon sensing of an object. A relatively higher hydraulic fluid buildup in the braking system can be achieved with the aid of the electromechanical brake booster.

In an example embodiment, the braking force-regulating components respectively generate, upon activation of the braking system in response to signals from the sensor device, a braking torque at wheel brake cylinders coupled to vehicle wheels, the respective braking torque at the vehicle wheels being generated individually by the control device as a function of a situation ascertained by the sensor device. The direction of travel of the vehicle can thereby be correspondingly influenced upon detection of an impending collision.

Preferably the braking force-regulating components encompass at least an ESP device and/or an ABS device. It is advantageous that such devices are well known and are installed in almost every vehicle.

Advantageously, the further active vehicle components encompass at least a vehicle steering device, a differential transmission device, an active chassis device, and/or a drive train device, on which the control device acts in regulating fashion in response to signals from the signal device in order to avoid a collision, thereby creating further assisting capabilities for collision avoidance.

It is furthermore preferred that the driver have the capability, at every point in time while the collision avoidance method is actively regulating a vehicle motion, of operating the vehicle in normal fashion, i.e., of overriding the system for collision avoidance.

It is moreover preferred that the driver be actively assisted by the collision avoidance method in the context of operation of the vehicle in order to prevent a collision, for example by way of an automatic intervention in the steering system.

Lastly, it is also preferred that the driver be assisted by the collision avoidance method in the context of operation of the vehicle, specifically at maximum up to a threshold value predefined by the driver. This is advantageous in particular when a vehicle speed control system (Tempomat or autonomous cruise control (ACC)) is present, in order to maintain an established speed despite initiation of the collision avoidance method.

Preferably the collision avoidance method is activatable or deactivatable by the driver in order to leave to the driver the decision as to whether or not to deliberately use the collision avoidance method.

The invention will be explained below, with reference to example embodiments, in conjunction with the figures. The dimensions depicted are not necessarily accurately scaled.

DETAILED DESCRIPTION

Figure 1:
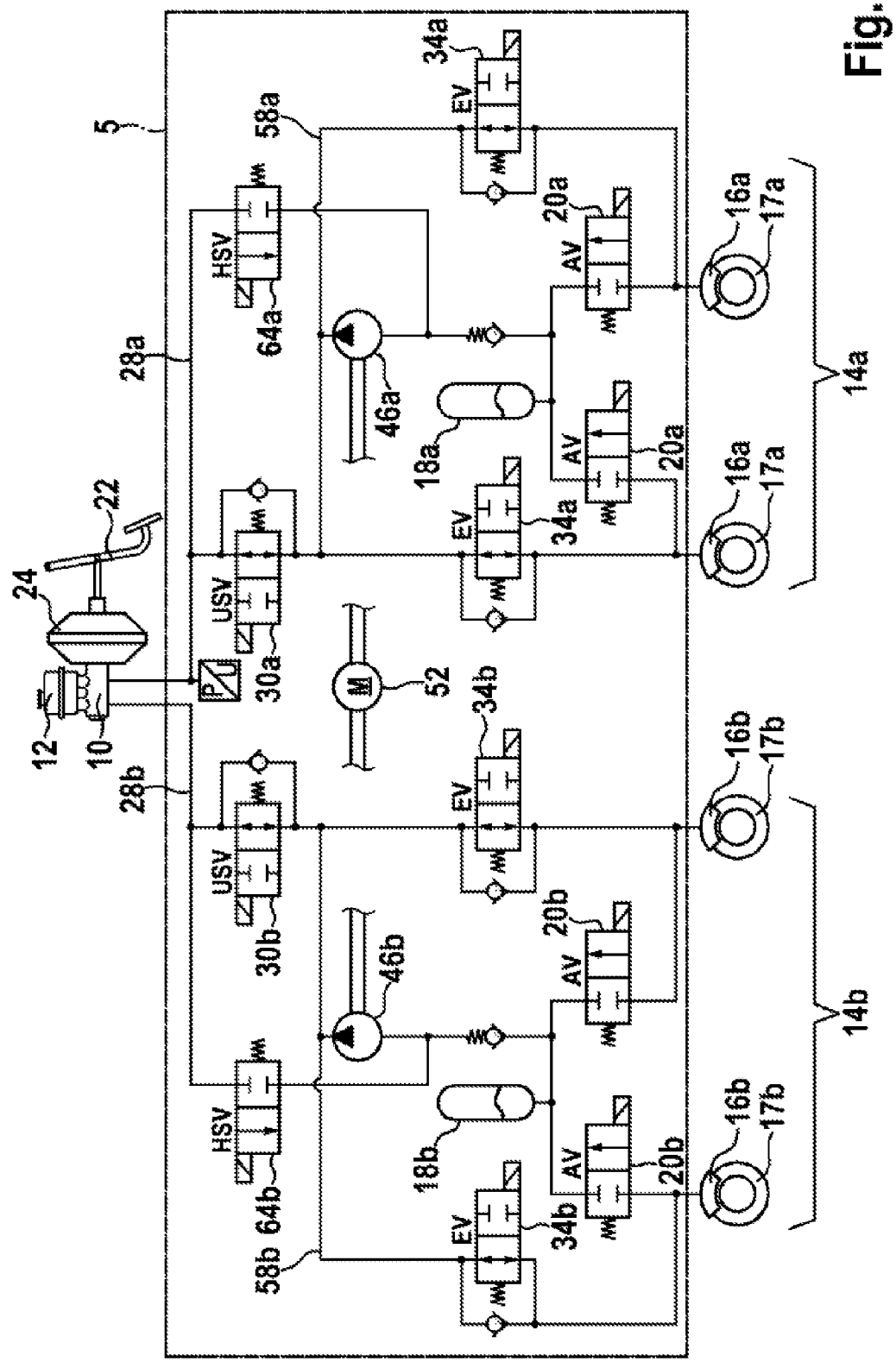
FIG. 1 schematically shows an example assemblage of a conventional braking system.

FIG. 1 schematically depicts, in a dot-dash border, a conventional braking system 5 known per se, which is therefore discussed only briefly herein (additional details of the system and its operation can be found in DE 10 2011 075 983 A1).

Some main components of braking system 5 are a brake master cylinder 10, which can be implemented e.g., as a tandem brake master cylinder. Braking system 5 is not limited, however, to the use of a tandem brake master cylinder.

A reservoir container 12 for hydraulic fluid (or brake fluid) is fluidically coupled to brake master cylinder 10.

Also coupled to brake master cylinder 10 is an electromechanical brake booster 24 (a so-called "iBooster"). Brake booster 24 can be, in particular, a continuously regulatable/continuously controllable brake booster.

By way of a brake actuation element 22 that is coupled to brake booster 24 and thus to brake master cylinder 10, a driver of the vehicle can exert a braking force that results in an elevation of the hydraulic fluid pressure in brake master cylinder 10 and in transfer lines 28a, 28b fluidically coupled thereto, the elevated fluid pressure built up in order to decelerate the vehicle being transferred via inlet valves ("EV") 34a, 34a, 34b, 34b (open when de-energized) to wheel brake cylinders 16a, 16a, 16b, 16b so that a braking torque is respectively generated at wheels 17a, 17a, 17b, 17b associated with the wheel brake cylinders.

Braking system 5 shown in FIG. 1 includes two brake circuits 14a, 14b. Wheels 17a, 17a associated with brake circuit 14a can be associated, for example, with one vehicle axle (e.g., the front axle). Wheels 17b, 17b associated with brake circuit 14b can correspondingly be the wheels of a rear axle of the vehicle. The components associated with brake circuits 14a, 14b, for example valves, are analogously disposed in the respective brake circuits. Other brake circuit layouts are also conceivable, however, wheels of one brake circuit being associated, for example, with different axles.

For pressure dissipation, respective outlet valves ("AV") 20a, 20a, 20b, 20b (closed when de-energized) are fluidically coupled in brake circuits 14a, 14b to wheel brake cylinders 16a, 16a and 16b, 16b respectively, the outlet valves being correspondingly energized for pressure dissipation.

Hydraulic fluid can then be displaced into pressure reservoir elements 18a, 18b in brake circuits 14a, 14b.

In addition, brake circuits 14a, 14b are provided with respective switchover valves 30a, 30b (open when de-energized) that, when energized, can fluidically decouple brake circuits 14a, 14b from brake master cylinder 10. A hydraulic fluid pressure increase can be generated in this case via (return delivery) pumps 46a, 46b in brake circuits 14a, 14b, pumps 46a, 46b being driven via a motor 52 and specifically via drive shafts that proceed from the motor and drive pumps 46a, 46b. Pumps 46a, 46b then, at their pump side (identified with a triangle in FIG. 1), pump hydraulic fluid under elevated pressure via a respective line 58a, 58b into wheel brake cylinders 16a, 16a, 16b, 16b in order to generate a respective braking torque at the associated wheels.

If braking system 5 depicted in FIG. 1 is used as an ESP/ABS system, pumps 46a, 46b then act as self-priming pumps, switchover valves 30a, 30b being closed and high-pressure switching valves 64a, 64b, which otherwise are closed when de-energized, being opened by energization. Hydraulic fluid can thus be transferred via inlet valves 34a, 34a, 34b, 34b to wheel brake cylinders 16a, 16a, 16b, 16b in order to generate braking torques at wheels 17a, 17a, 17b, 17b. It is known that control can be applied to the inlet valves independently of each other in order to decelerate wheels 17a, 17a, 17b, 17b individually in order to compensate in specific driving situations, for example in the context of an ESP intervention, for so-called yaw torques so as to stabilize the vehicle being driven. In this case, braking system 5 has an X-type brake circuit distribution.

For reasons of brevity and because their function is known to one skilled in the art, the return delivery valves depicted are not explained in further detail.

According to an example embodiment of the present invention, braking system 5 is used to avoid a collision between a traveling vehicle and, for example, a person suddenly appearing in front of the traveling vehicle, another vehicle, or another object, or in general with an obstacle, where the obstacle can also be stationary, According to the example embodiment, the functionality of braking system 5 is combined with the functionality of brake booster 24, such that the functionality of braking system 5 (or of a control system, not depicted here, in combination with a sensor device, as will be further explained below) serves to control the inlet valves in accordance with the situation (i.e., evasive maneuver) and the functionality of the electromechanical brake booster 24 serves to build up a corresponding high pressure of the hydraulic fluid, which would not be possible with the ESP system alone with regard to the high pressure buildup.

Any type of sensor or sensors mounted or attached at a suitable location on the vehicle, for example based on a radar, ultrasonic, infrared, and/or imaging device or devices, can serve as a sensor device (not depicted here). It is conceivable in this regard for the sensor device or devices to sense the entire surroundings of the vehicle, preferably three-dimensionally, or also only specific so-called "collision regions," for example a region in front of the vehicle and/or to the side thereof. As should be known to one skilled in the art, multiple collision regions can partly overlap in order to avoid "gaps" in sensing.

Upon sensing of one or more obstacles (persons, vehicles, or objects in general) that would result in a collision with the vehicle if the vehicle continued to travel normally, the at least one sensor device conveys one or more signals to a control device located in the vehicle. The control device then calculates, on the basis of vehicle-specific data such as instantaneous speed, acceleration/deceleration, direction of travel (ascertained e.g., on the basis of GPS data), applied steering angle, condition of the roadway surface (e.g., wet/dry), etc., and on the basis of the position or trajectory (in the case of moving obstacles) relative to the vehicle, a possible collision location, so that, by corresponding application of control to the braking system, the vehicle can be steered around the obstacle and/or decelerated so that a collision cannot occur. In an example embodiment, the control device intervenes in the steering system (as an "assisting" steering aid), differential transmission, and/or active chassis components (e.g., in terms of suspension, shock absorbers, stabilizers, etc.); and/or intervenes in the drive system itself, for example by decreasing the engine torque, reducing/shutting off fuel delivery, modifying the gear ratio, etc.

A typical evasive maneuver situation will be explained with reference to FIGS. 5a and 5b, and the functionality of the essential components will then be explained with reference to the other figures.

Figure 5A:
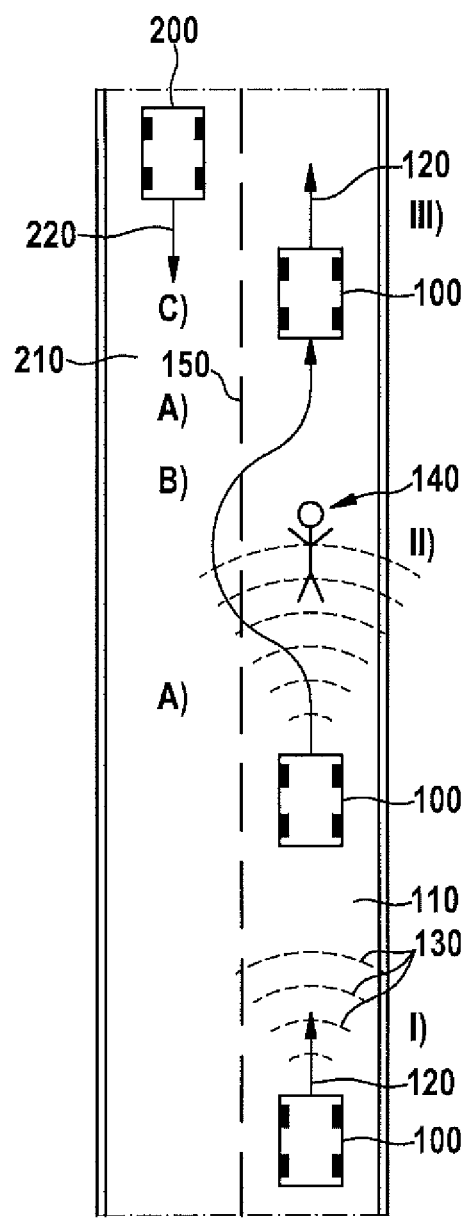
FIG. 5a schematically depicts a plan view of temporally successive driving situations, in an operation according to an example embodiment of the present invention.

FIG. 5a is a plan view showing a vehicle 100 that is moving on a roadway 110 in the direction of arrow 120. In a first phase I), the sensor device (not depicted here) of vehicle 100 senses the surroundings in front of vehicle 100, indicated by "sensing waves" 130. An obstacle is not yet sensed here. In a second phase II), a person 140 located in front of vehicle 100 in the direction of travel is sensed. As a result thereof, the control device in vehicle 100 causes, on the basis of the received signals, an operating state A) of vehicle 100. In FIG. 5b this operating state A) is characterized in that the braking system acts on wheels 105 of vehicle 100, by generating corresponding braking torques, in such a way that vehicle 100 follows the direction of arrow 125. In state A) the braking torque on wheels 105, 105 (i.e., the wheels on the right side of vehicle 100 with reference to the direction of travel in the direction of arrow 125) is relatively lower than the braking torque on wheels 106, 106, so that the vehicle swerves to the left (i.e., in the direction of arrow 125). Vehicle 100 is automatically guided past obstacle 140 by a corresponding intervention in the braking system. In an example, other interventions mentioned above (steering, etc.) can also be performed.

Because vehicle 100 is now partly or entirely located in lane 210 for oncoming traffic (depicted by a vehicle 200 moving in the direction of arrow 220), the control device causes an operating state B) of vehicle 100 in which the braking torque for wheels 105, 105 (right side of the vehicle) is relatively higher than for wheels 106, 106 (left side of the vehicle), so that vehicle 100 as a whole follows the direction of arrow 126 (see FIG. 5b), i.e., back to the original lane 110. The control device can be designed in such a way that operating state B) is brought about responsive to vehicle 100 being located in the oncoming traffic lane 210 (ascertained by the sensor device, for example, on the basis of roadway markings 150, 150). The presence of vehicle 200 (which can be sensed by the sensor device) in the collision region of vehicle 100 can of course also be a cause for bringing about operating state B).

In order for vehicle 100 once again to move along lane 110 after state B) ("veer right"), a state A) is once again caused, so that in phase III) vehicle 100 arrives at a state C) in which the braking torques on all the wheels 105, 105, 106, 106 are once again symmetrical, so that vehicle 100 is again following the direction indicated by arrow 120 (see FIG. 5a).

In an example embodiment, the driver is always given the ability to override the system, i.e., even though collision avoidance has been initiated, the driver is able to accelerate or brake.

If an activated adaptive cruise control (ACC) system is present, collision avoidance can be initiated but the brake torque that has been built up is compensated for by raising the engine torque, so that vehicle does not decelerate but instead conforms to the driver's stipulation (e.g., gas pedal position, speed stipulated by ACC).

In an example embodiment, collision avoidance is initiated, and the built-up braking torque is distributed, in such a way that the vehicle decelerates only in accordance with the driver's stipulation, in some circumstances by raising the engine torque if the driver is "standing" only relatively gently on the brake.

In an example embodiment, the collision avoidance function is activatable and deactivatable by the driver.

Figures 2A, 2B:
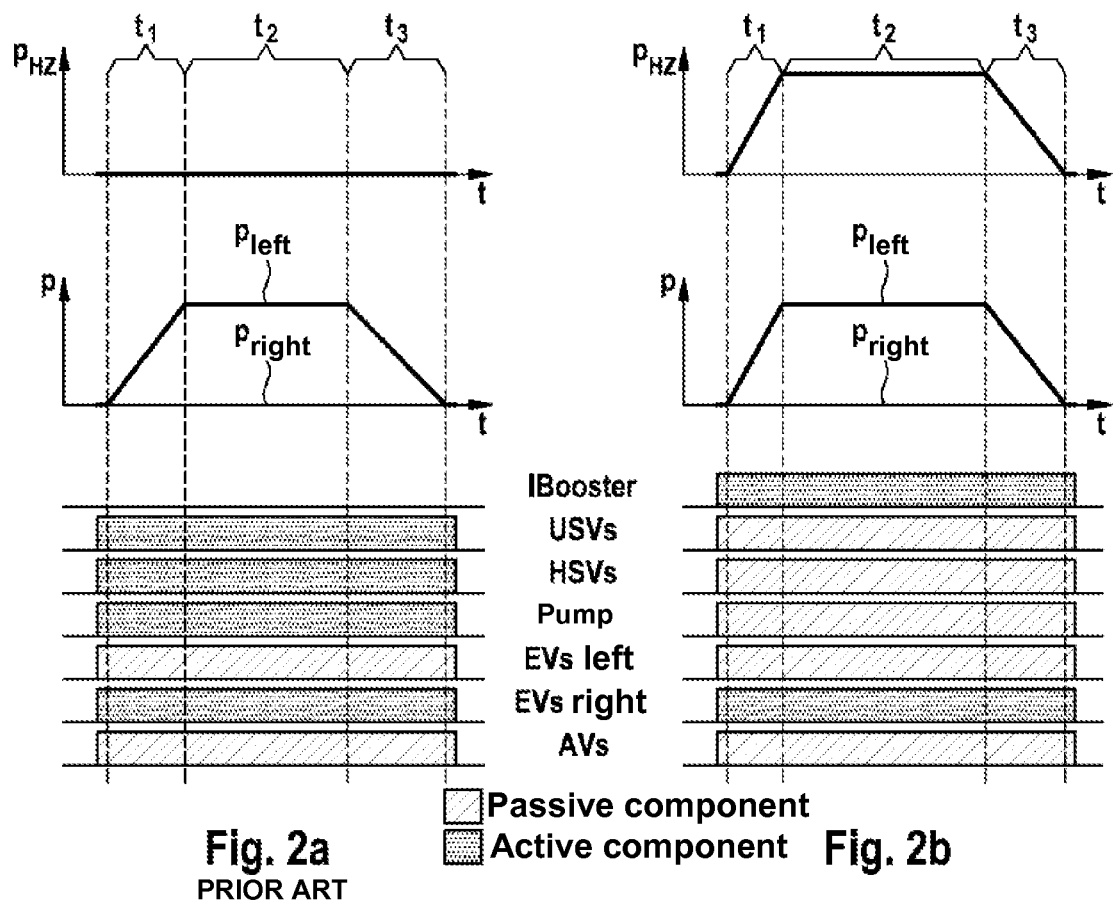
FIG. 2a shows a diagram of example hydraulic fluid pressures, as a function of time in each case, for a conventional braking system with no electromechanical brake booster, including pertinent depictions of operating states of essential components of the conventional braking system.
FIG. 2b shows diagrams of hydraulic fluid diagrams, as a function of time in each case, for a braking system including an electromechanical brake booster, including pertinent depictions of operating states of essential components of the braking system, according to an example embodiment of the present invention.

FIGS. 2a and 2b show comparative pressure profiles (depicted schematically or qualitatively) of a pressure in the master cylinder, i.e., $p_{HZ}(t)$, specifically for conventional systems having no electromechanical brake booster (FIG. 2a, top diagram) and with the use of an electromechanical brake booster (iBooster, FIG. 2b, top diagram). It is apparent here that in the top diagram in FIG. 2a, the pressure in the master cylinder (inlet pressure) is zero, whereas in FIG. 2b the corresponding pressure with the use of an electromechanical brake booster first rises (time window $t_1$), then remains constant at a corresponding level (time window $t_2$), before dropping again to zero (time window $t_3$). As indicated by the bars depicted below the diagrams, the time windows $t_1$, $t_2$, $t_3$ are characterized by an actuation duration of corresponding components, e.g., main switching valves ("HSVs") open during $t_1$ or "pump on" during $t_1$ (see FIG. 2a). Hatched bars indicate a passive component (i.e., left inlet valves open), while dotted bars indicate an active component (i.e., right inlet valves closed or iBooster active, FIG. 2b). The respective outlet valves ("AVs") are closed. During $t_2$ and $t_3$ in FIG. 2a, the main switching valves ("HSVs") can optionally be open or the pumps (FIG. 2a) can optionally be activated.

Figure 5B:
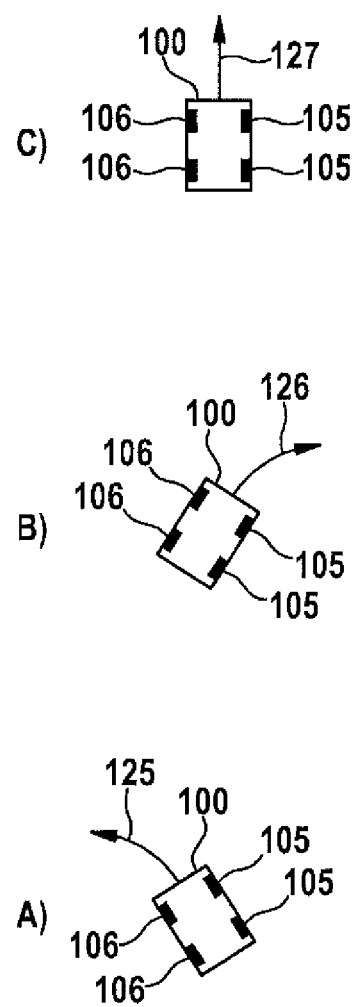
FIG. 5b shows the vehicle operating states corresponding to the driving situations depicted in FIG. 5a, indicating directions of motion of the vehicle as a whole, according to an example embodiment of the present invention.

The middle diagrams in FIGS. 2a and 2b respectively depict the brake pressure for the left side of the vehicle $p_{left}$ and for the right side of the vehicle $p_{right}$, analogously to operating states A) and B) shown in FIGS. 5a and 5b.

Figure 3:
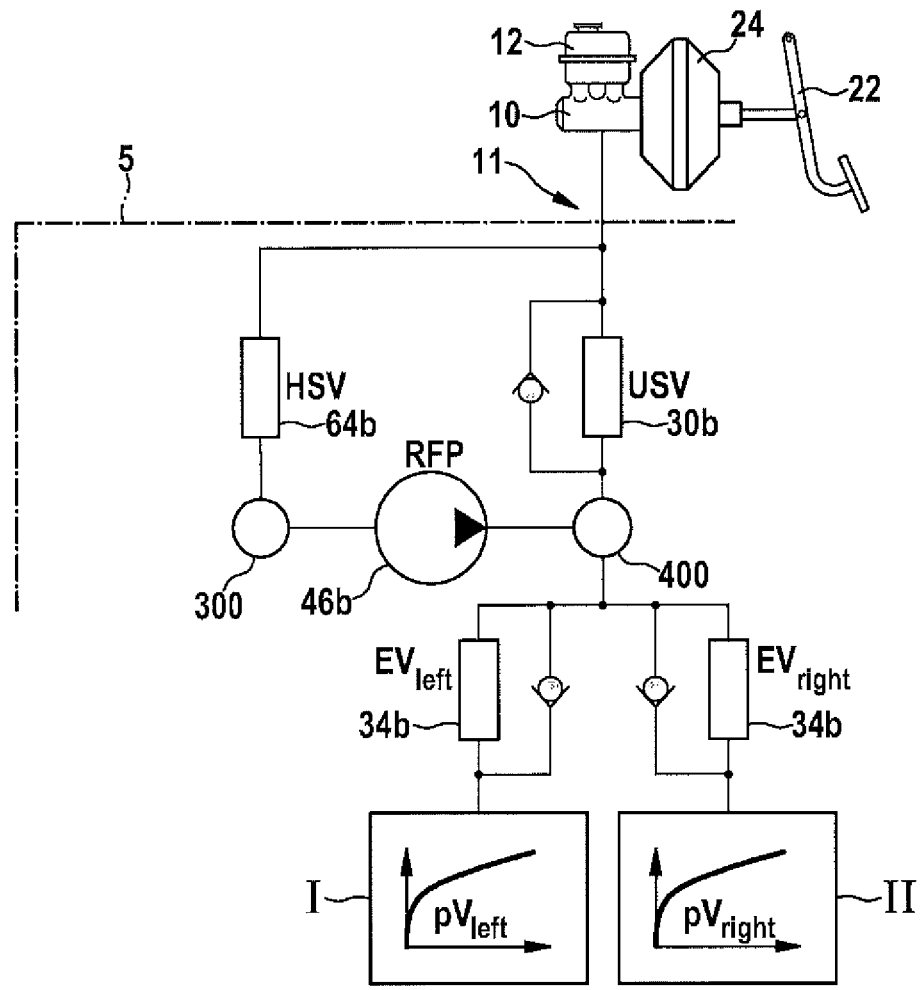
FIG. 3 is a detail view of a braking system assemblage, according to an example embodiment of the present invention.

FIGS. 3 as well as 4a and 4b each provides details according to an example embodiment of the present invention, including a braking system 5 with a brake actuation element 22, reservoir 12, master cylinder 10, high-pressure valve 64b (switchable between two states), switchover valve 30b (controllable), pump 46b (controllable), as well as inlet valves 34b, 34b that are controllable for the left and the right wheel. Reference character 300 designates the pre-chamber hydraulic fluid volume between high-pressure switching valve 64b and (return delivery) pump 46b. Reference character 400 designates the hydraulic fluid system volume between switchover valve 30b and the two inlet valves 34b, 34b.

Diagrams I and II represent in general a pressure/volume ratio that can be designed in customer-specific fashion respectively for the left and right inlet valve 34b, 34b. Reference character 11 designates a suction line between master cylinder 10 and braking system 5 (the hydraulic unit). The outlet valves and pressure reservoir are not depicted here for the sake of simplicity.

Figure 4A:
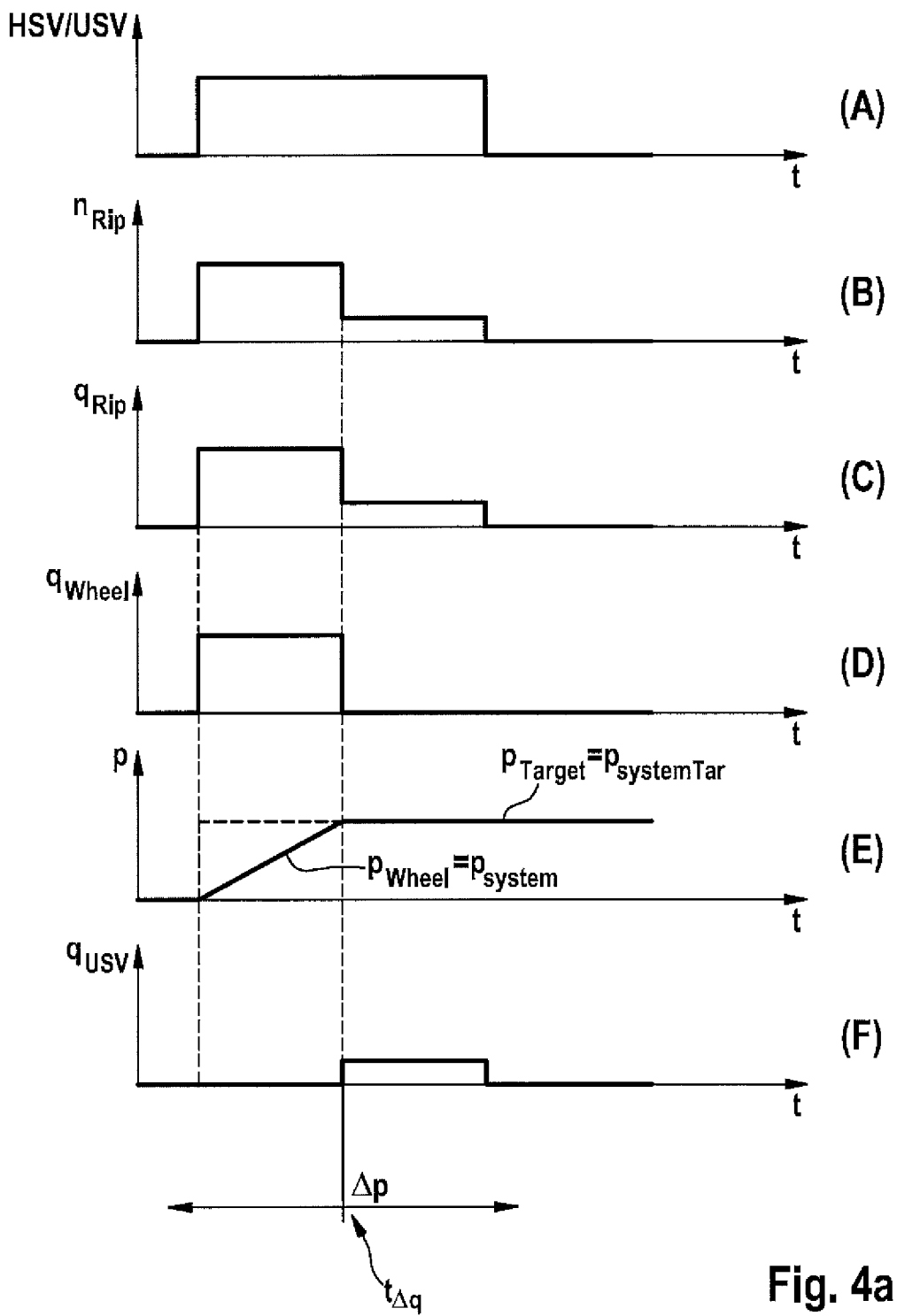
FIG. 4a shows pressure profile diagrams of essential braking system components, as a function of time in each case, for better explanation of the operations depicted in FIG. 4b.
Figure 4B:
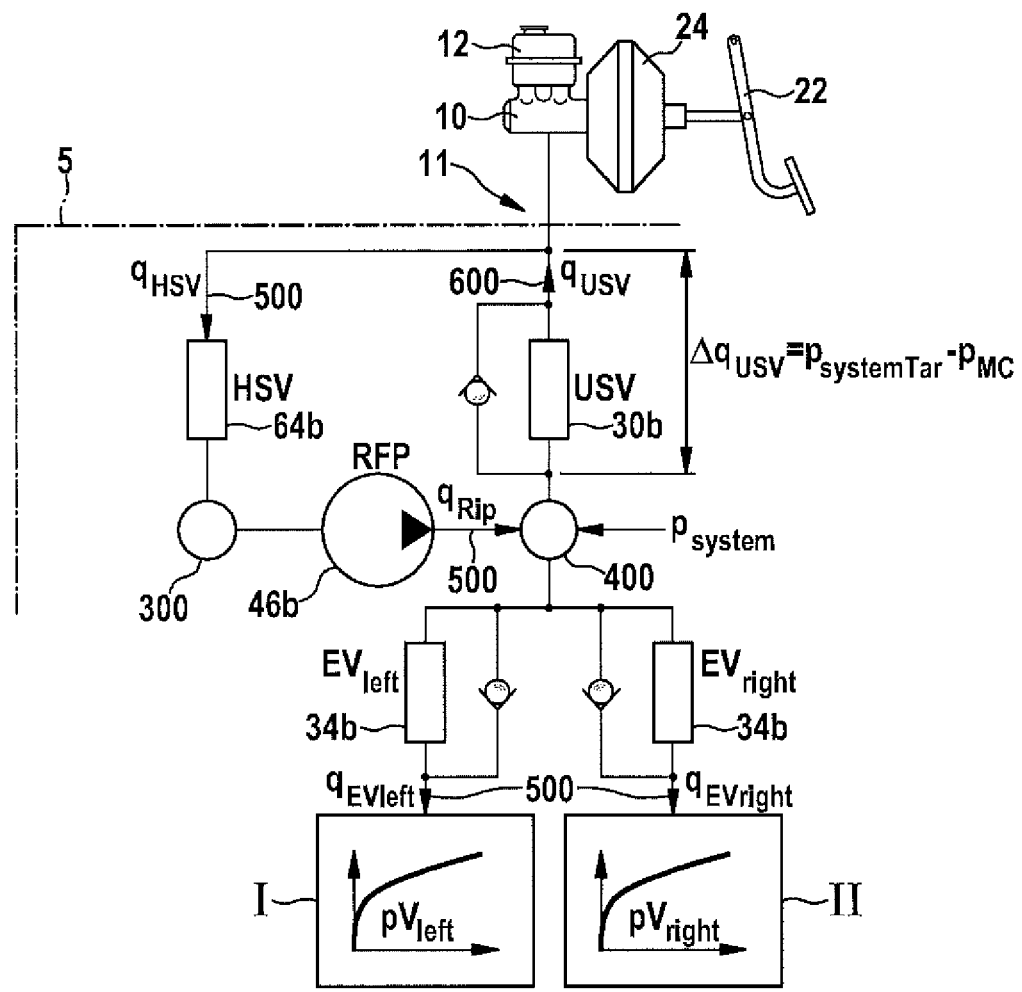
FIG. 4b shows the braking system of FIG. 3 with the addition of volumetric flow directions of hydraulic fluid, according to an example embodiment of the present invention.

FIG. 4b shows the detail view of braking system 5 depicted in FIG. 3 with the addition of the volumetric flow directions of the hydraulic fluid.

FIG. 4a shows pertinent time profiles (A) to (F) (depicted schematically or qualitatively), specifically of the operating states (ON/OFF) of the high-pressure switching valve HSV and switchover valve USV [diagram (A)], of the rotation speed $n_{Rfp}$ of the return delivery pump Rfp (46b) [diagram (B)], of the volumetric flow rate $q_{Rfp}$ (in milliliters/second) of the return delivery pump (46b) [diagram (C)], of the volumetric flow rate $q_{wheel}$ to a wheel brake cylinder or inlet valve 34b [diagram (D)], of the brake pressure p, and of the volumetric flow rate $q_{USV}$ of switchover valve 30b.

FIG. 4b depicts the situation in which a pressure buildup for generating braking torques (see pV diagrams I and II) is proceeding, specifically on the basis of the directional arrows, characterized by the reference character 500, for $q_{HSV}$, $q_{Rfp}$, $q_{EVleft}$ (inlet valve for left wheel) and $q_{EVright}$ (inlet valve for right wheel). Switchover valve 30b serves here as a pressure relief valve, the directional arrow (characterized by reference character 600) for $q_{USV}$ being intended to depict hydraulic fluid flowing back to master cylinder 10.

In FIG. 4a it is evident with reference to diagrams (A) to (F), and in particular with reference to diagram (F), that control of the brake pressure takes place only starting at a point in time $t_{Ap}$, i.e., not until $q_{USV}$ is not equal to zero.

What is claimed is:

1. A method for avoiding a collision between a moving vehicle and an object in a possible collision region during motion of the vehicle, wherein the vehicle includes (a) a sensor device for monitoring at least one collision region that is located in the surroundings of the vehicle in order to sense the object, (b) a vehicle braking system for decelerating the vehicle, the braking system including an electromechanical brake booster situated between a brake actuation element and a brake master cylinder, and the braking system including braking force-regulating components coupled to the electromechanical brake booster via a hydraulic fluid, and (c) a control device that is configured to receive signals from the sensor device and, on the basis of the signals, control the electromechanical brake booster and the braking force-regulating components, the method comprising:

responsive to the signals from the sensor device indicating that the object has been sensed in the at least one collision region, controlling, by the control device, the electromechanical brake booster and the braking force-regulating components to modify a driving direction of the vehicle, wherein the control device activates the electromechanical brake booster to achieve a build up pressure in a hydraulic fluid pressure buildup in the braking system in response to signals from the sensor device upon sensing the object, wherein the control device controls the braking force-regulating components to apply the build up pressure asymmetrically to wheels of the moving vehicle in order to steer the moving vehicle around the sensed object via the asymmetric operation of the braking system, and wherein the build up pressure is achieved through the electromechanical brake booster without control applied to a pump of the braking system.

2. The method of claim 1, further comprising the sensor device monitoring one or more three-dimensional collision regions that, individually or together, cover the entire surroundings of the vehicle, and generating the signals using at least one of radar, ultrasound, and image acquisition.

3. The method of claim 1, further comprising, responsive to the controlling, the braking force-regulating components respectively generating a braking torque at wheel brake cylinders coupled to vehicle wheels, the respective braking torque at the vehicle wheels being controlled independently by the control device in response to the signals.

4. The method of claim 1, wherein the braking force-regulating components include at least one of an electronic stability control (ESP) device and an anti-lock braking system (ABS) device.

5. The method of claim 1, wherein the further active vehicle components include at least one of a vehicle steering device, a differential transmission device, an active chassis device, and a drive train device.

6. The method of claim 1, wherein a driver is able to perform a braking control and an acceleration control during the controlling performed by the control device.

7. The method of claim 6, wherein the controlling assists the driver to perform at least one of the braking and the acceleration.

8. A collision avoidance system for a vehicle, comprising:
a sensor device configured to monitor at least one possible collision region, located in surroundings of the vehicle, for sensing an object in the possible collision region during motion of the vehicle;
a vehicle braking system for decelerating the vehicle and that includes an electromechanical brake booster situated between a brake actuation element and a brake master cylinder and that includes braking force-regulating components coupled to the electromechanical brake booster via a hydraulic fluid; and
a control device configured to receive signals from the sensor device and, responsive to the received signals indicating that the object has been sensed in the at least one possible collision region, control the braking force-regulating components to modify a driving direction of the vehicle, in such a way that a collision of the vehicle with the object is avoided, wherein the control device activates the electromechanical brake booster to achieve a build up pressure in a hydraulic fluid pressure buildup in the braking system in response to signals from the sensor device upon sensing the object, wherein the control device controls the braking force-regulating components to apply the build up pressure asymmetrically to wheels of the moving vehicle in order to steer the moving vehicle around the sensed object via the asymmetric operation of the braking system, and wherein the build up pressure is achieved through the electromechanical brake booster without control applied to a pump of the braking system.

9. The system of claim 8, wherein the sensor device is configured to monitor one or more three-dimensional collision regions that, individually or together, cover the entire surroundings of the vehicle, and is configured to generate the signals using at least one of radar, ultrasound, and image acquisition.

10. The system of claim 8, wherein the control device is configured to respond to the signals by controlling the braking force-regulating components respectively for generating a braking torque at wheel brake cylinders coupled to vehicle wheels, the controlling of the respective braking torques at the vehicle wheels being performed independently by the control device in response to the signals.

11. The system of claim 8, wherein the braking force-regulating components include at least one of an electronic stability control (ESP) device and an anti-lock braking system (ABS) device.

12. The system of claim 8, wherein control device is configured to respond to the signals by further controlling at least one of a vehicle steering device, a differential transmission device, an active chassis device, and a drive train device.

13. The system of claim 8, wherein a driver is able to perform a braking control and an acceleration control during the controlling performed by the control device.

14. The system of claim 13, wherein the controlling assists the driver to perform at least one of the braking and the acceleration.

15. The method of claim 1, wherein the braking force-regulating components apply the build up pressure asymmetrically to the wheels of the moving vehicle by applying a first total braking torque to the wheels on a first side of the vehicle and applying a second total braking torque that is lower than the first total braking torque on the wheels on a second side of the vehicle.

16. The system of claim 8, wherein the braking force-regulating components apply the build up pressure asymmetrically to the wheels of the moving vehicle by applying a first total braking torque to the wheels on a first side of the vehicle and applying a second total braking torque that is lower than the first total braking torque on the wheels on a second side of the vehicle.

* * * * *